2,820,922

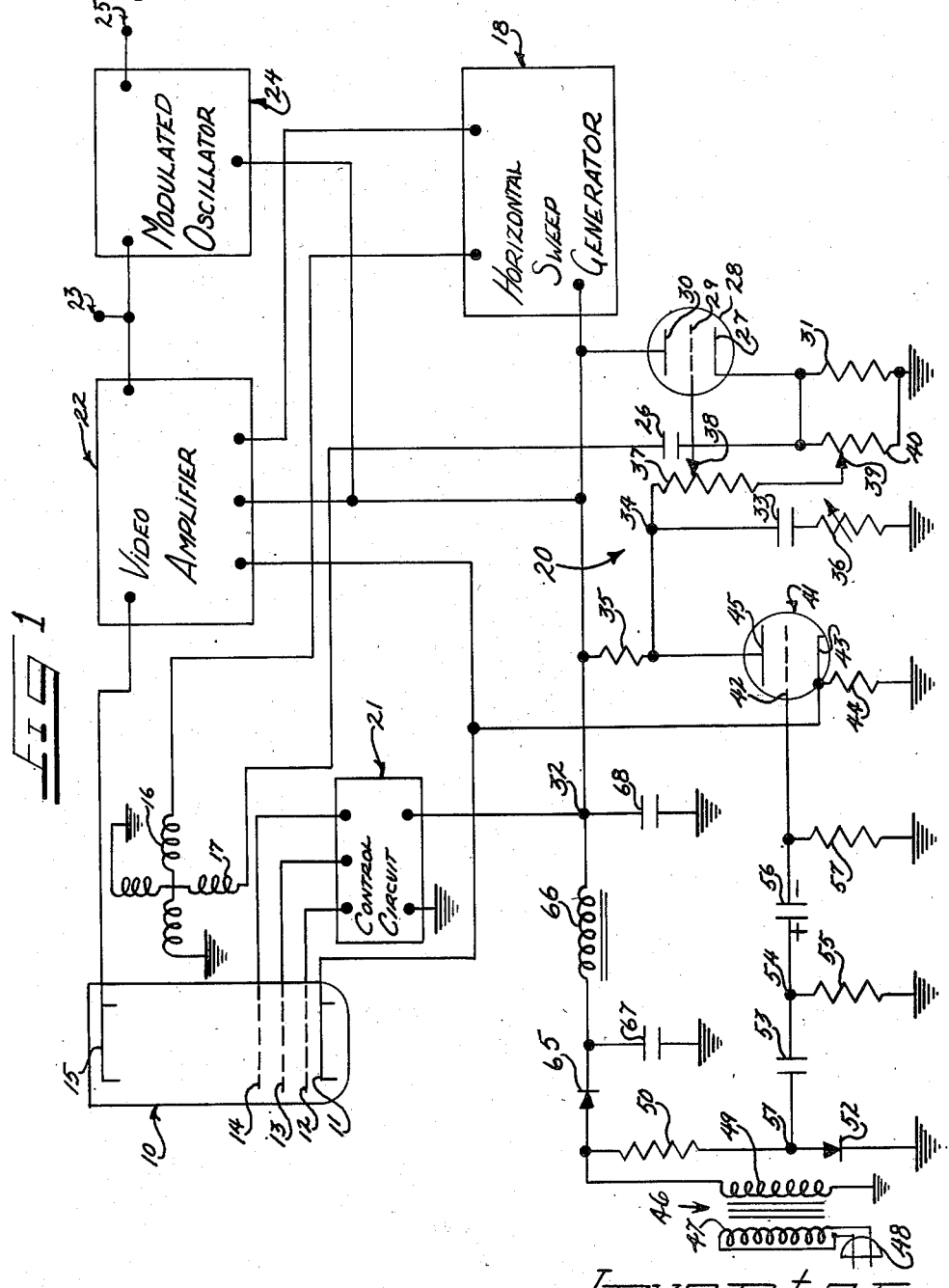

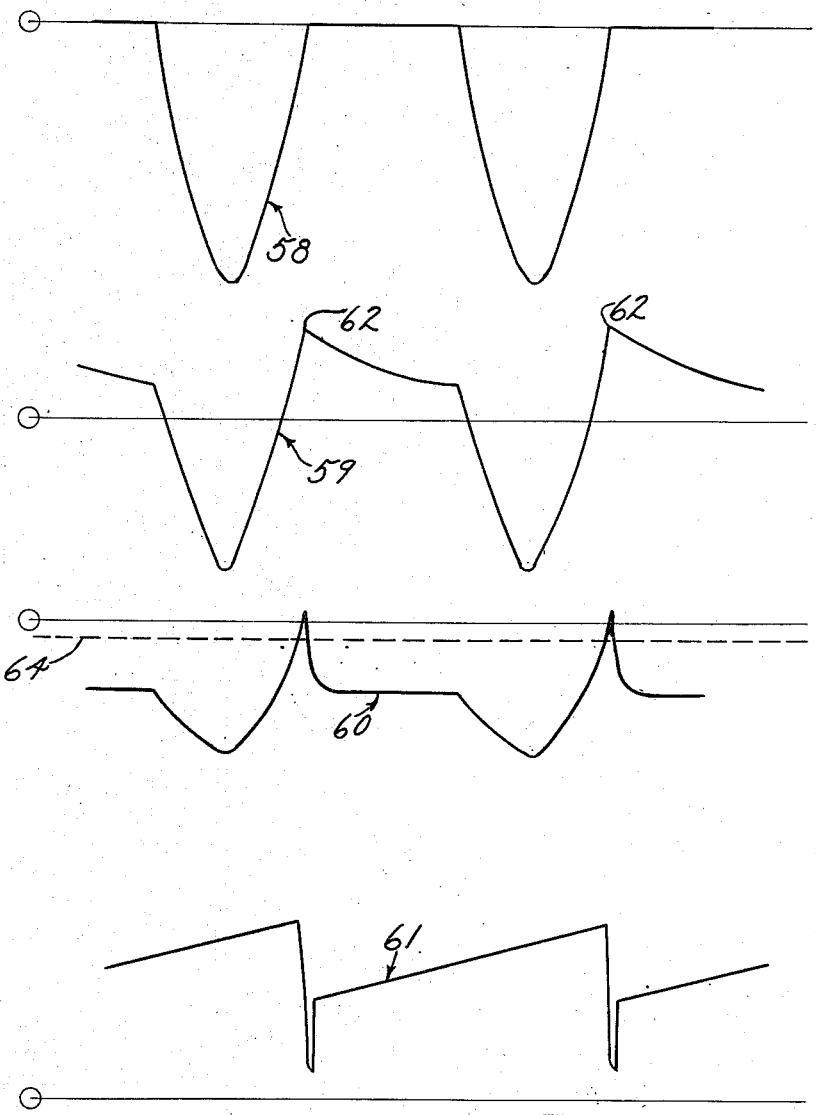

LINE VOLTAGE DERIVED SWEEP DRIVING CIRCUIT

George H. Fathauer, Decatur, Ill., assignor to Thompson Products, Inc., Cleveland, Ohio, a corporation of Ohio Application August 2, 1954, Serial No. 447,336

4 Claims. (Cl. 315—27)

This invention relates to a line voltage derived sweep driving circuit and more particularly to a circuit for driving the vertical sweep or scan in a television camera or the like in which the drive is obtained directly from a voltage derived from the alternating current supply line.

To control the vertical sweep in television cameras, a 60 cycle wave of saw tooth configuration is usually desired and it is also desired that this 60 cycle saw tooth wave be synchronized with the 60 cycle supply line voltage or current to obviate various undesirable effects. It has heretofore been the practice to generate the 60 cycle saw tooth wave from an oscillator and to then synchronize this saw tooth wave with a voltage obtained from the supply line by controlling the oscillator. For example, the 60 cycle saw tooth wave may be generated through suitable frequency divider circuits from a 31.5 KC oscillator and suitable synchronizing means may be employed for synchronizing the operation of the oscillator with the 60 cycle supply line voltage. One such circuit is disclosed in my co-pending application entitled "Frequency Stabilizing Circuit," U. S. Ser. No. 341,526, filed March 10, 1953, now Patent No. 2,761,972.

According to this invention, means are provided for generating a saw tooth wave directly from a voltage derived from the supply line to thus eliminate the necessity for the synchronizing circuits.

To obtain the saw tooth wave, a capacitor may be gradually charged up through suitable resistance means and then discharged periodically and abruptly under the control of a signal derived from the supply line voltage. The voltage developed across the capacitor may be applied to the deflection circuit of a television picture tube, for example, preferably by applying the voltage across the capacitor to the grid circuit of a space discharge device having the vertical deflection coil of a television camera tube in the anode-cathode circuit thereof. The deflection coil may preferably be in the cathode circuit in a manner such as to provide cathode follower action to increase the linearity of the deflection with respect to time.

The capacitor of the saw tooth wave generator may preferably be discharged periodically by means of a space discharge device having an anode and a cathode between which the capacitor is connected, the device being normally nonconductive but being rendered conductive periodically through positive pulses applied to the grid thereof, to discharge the capacitor.

The pulses for application to the saw tooth wave generator are developed from a signal derived from the supply line. The supply line signal will under ideal conditions have a true sine wave form and although the wave form of the supply line signal may vary appreciably from a true sine wave, it will normally be of a sine wave form in the sense that there is a continuous comparatively smooth change in amplitude of the signal with no abrupt changes in the rate of change of the amplitude of the signal.

Pulses may be obtained from such a sine wave signal as obtained from a supply line by conducting or transmitting only the positive peaks (or negative peaks) of the signal, by using a clipper circuit biased at a certain level relative to the amplitude of the signal. However, with such a method, pulses having steep leading and trailing edges cannot be obtained, it is difficult to obtain pulses of large amplitude, and without extremely accurate control, pulses of short duration cannot be uniformly and reliably obtained.

According to a specific feature of this invention, clipping means are utilized to obtain a signal from the supply line signal having a wave form such that abrupt changes in the rate of change in the amplitude of the signal occur in each cycle, and such a signal is applied to a differentiating circuit having an output varying in accordance with the rate of change of the signal input thereto.

Such clipping means should operate at a level substantially lower than the positive peak amplitude of the supply line signal (or substantially higher than the negative peak amplitude of the supply line signal) to obtain an abrupt change in the rate of change of the amplitude of the clipped signal, and preferably, the clipping means may operate to transmit only the positive half (or only the negative half) of each cycle, the rate of change of amplitude of a sine wave signal being the greatest at the region where the polarity of the signal changes. Most preferably, a half-wave rectifier is used which will clip the signal at the optimum level.

The differentiating circuit may comprise a resistor and a capacitor connected in series across the output of the clipping means and having a time constant that is relatively short as to compared to the duration of one cycle of the supply line signal. With such a circuit, a pulse will be developed across the resistor when there is an abrupt change in the rate of change of amplitude of the clipped signal.

The pulses developed across the resistor of the differentiating circuit may be applied directly to the saw tooth generator, but in the alternative, they may be applied through a coupling circuit which also functions to supply grid bias for the space discharge device used to discharge the capacitor in the saw tooth generator. This coupling circuit may comprise a resistor and a capacitor connected in series across the resistor of the differentiating circuit. When the positive pulses from the differentiating circuit are applied, the grid of the discharge may be driven positive with respect to the cathode so that current may flow and this current may charge up the capacitor of the coupling circuit with a polarity such that the grid is maintained at a negative potential beyond cut-off in the time periods between pulses. This may function to increase the effective sharpness of the pulses since the capacitor may be charged up in the initial portion of each pulse and the potential of the grid may be sharply decreased after the pulse reaches its maximum value. This bias arrangement is, of course, self regulating. The time constant of the coupling circuit should be substantially greater than the duration of one cycle of the supply line signal.

Instead of the resistor-capacitor coupling circuit, a fixed adjustable bias circuit may be used, if desired.

In accordance with a further feature of the invention, the television camera or the like may have a power transformer including a primary arranged for connection to the supply line and a secondary winding for providing the signal for operation of the saw-tooth wave generator, and this secondary winding may also serve the function of energizing circuits of the camera, such as the saw-tooth wave generator circuit of this invention. Thus, no separate winding is required.

Another feature of the invention is in the provision of an impedance, preferably in the form of a resistor, in the cathode circuit of the discharge device used to discharge the capacitor of the saw-tooth wave generator, to develop a signal for blanking of the pickup tube of the camera. Since the cathode of the discharge device will have a positive pulse output at the time when the capacitor of the saw tooth generator is discharging, which is the time when blanking is desired, this cathode may be connected to the cathode of the pickup tube of the camera to provide the requisite blanking.

An object of this invention, accordingly, is to provide an improved sweep driving circuit in which a saw-tooth wave is generated directly from a voltage drive from the supply line.

Another object of this invention is to provide an improved saw tooth wave generator controlled by a signal derived from a supply line.

A further object of this invention is to provide an improved circuit for controlling generation of a saw tooth wave from a sine wave signal.

This invention contemplates other objects, features and advantages which will become more fully apparent from the following detailed description taken in conjunction with the accompanying drawings which illustrate a preferred embodiment and in which:

Figure 1 is a circuit diagram of a television camera incorporating the sweep driving circuit of this invention; and Figure 2 is a graph illustrating the wave forms at certain points in the circuit in Figure 1.

Reference numeral 10 designates a television camera pickup tube which may be of the type referred to in the art as a vidicon tube. The tube 10 may comprise an electron-emitting cathode 11, a control grid 12, and accelerating grid 13 and a focusing grid 14 for forming and focusing a beam of electrons at a target 15 on which a light image to be transmitted may be focused.

The cathode ray or electron beam may be caused to scan the target 15 by means of horizontal and vertical deflection coils 16 and 17. The horizontal deflection coils 16 may be connected to a horizontal sweep generator 18 illustrated in block form in the drawing and the vertical deflection coils 17 may be connected to a vertical sweep generator generally designated by reference numeral 20 which forms a basic feature of this invention and will be described in detail hereinafter.

The grids 12, 13 and 14 may be connected to a control circuit 21 and the target 15 may be connected to a video amplifier 22 which is also connected to the horizontal and vertical sweep generators. The output of the video amplifier may be connected to a jack 22 which may be coupled through suitable cables to a receiver, and the output of the video amplifier 22 may also be connected to a modulated oscillator 24 which may have an output connected to a jack 25. The jack 25 may be coupled to the R. F. input of an receiver in the event it is not desired to use a direct cable connection from the jack 23.

In operation, the cathode ray beam in the tube 10 scans the target 15 horizontally at a rate determined by the horizontal sweep generator and the beam scans the target vertically under control of the vertical sweep generator 20. The horizontal and vertical sweep generators 18 and 20 are connected to the video amplifier to provide synchronizing signals that are transmitted to the receiver to control horizontal and vertical sweep circuits in the receiver and the video signal developed at the target 15 is also transmitted through the video amplifier to the receiver to form at the receiver picture tube the image focused on the target 15. The horizontal repetition rate may for example be 15,750 cycles per second and the vertical repetition rate may be 60 cycles per second.

According to this invention, the vertical sweep generator 20 may act to generate the vertical sweep driving signal, which may have a saw tooth wave form, directly from a signal derived from the supply line. In particular, the vertical deflection coil 17 may be connected through a coupling capacitor 26 to the cathode 27 of a discharge device 28 also having a grid 29 and a plate or anode 30. The cathode 27 may be connected through a resistor 31 to ground and the anode 30 may be connected to a circuit point 32 at a relatively high positive potential relative to ground. A signal having a generally saw tooth wave form may be applied to the control grid 29 to generate a saw tooth wave of current in the vertical deflection coils 17 and obtain proper deflection of the cathode ray beam.

For this purpose, a capacitor 33 may have one terminal connected to a circuit point 34 which is connected through a resistor 35 to the circuit point 32 with the other terminal of the capacitor connected to ground, preferably through a rheostat 36. The capacitor 33 is gradually charged up through the rheostat 36 and resistor 35 but is periodically and properly discharged to develop a voltage of saw tooth wave form at the circuit point 34. This circuit point 34 is connected to one end of a potentiometer 37 having a movable contact 38 connected to the grid 29 with the other end of the potentiometer 37 being connected to a movable contact 39 of a potentiometer 40 connected across the cathode resistor 31. By adjustment of the movable contact 39, the bias of the device 28 may be adjusted and by adjusting the position of the movable contact 38, the magnitude of the saw tooth wave applied to the grid 29 may be adjusted so as to obtain proper deflection of the cathode ray beam.

The capacitor 33 may be periodically and abruptly discharged through means controlled directly from the supply line voltage which may preferably comprise a discharge device 41 having a control grid 42, a cathode 43 connected through a resistor 44 to ground and a plate or anode 45 connected to the circuit point 34. The device 41 may be normally biased beyond cut-off so as to be non-conductive but may be periodically rendered conductive so as to discharge the capacitor 33.

For this purpose, a power transformer 46 may be provided having a primary winding 47 connected to a plug 48 which may be inserted in a conventional outlet to energize the primary 47. The energy may be in the form of 60 cycle alternating current, as is standard in this country. The transformer 46 also has a secondary winding 49 which may have one terminal connected to ground with its other terminal connected to a resistor 50 to a circuit point 51 which may be connected through clipping means in the form of a half-wave rectifier or diode 52 to ground. The polarity of the diode 52 may be such that when the terminal of the secondary winding 49 connected to the resistor 50 is positive, the diode 52 may conduct so that there will be a very low positive potential at the circuit point 51. When such terminal of the secondary winding 49 is negative with respect to ground, the diode 52 will not conduct and the potential of the circuit point 51 will be at a negative value equal to the negative potential of such terminal of the secondary winding 29. This signal developed at the circuit point 51 may be applied to a differentiating circuit which may comprise a capacitor 53 between the circuit point 51 and a circuit point 54 with a resistor 55 between the circuit point 54 and the ground. The circuit point 54 could be coupled directly to the grid 42 but preferably, a coupling circuit is provided including a second capacitor and resistor combination including a capacitor 56 between the circuit point 54 and the grid 42 of the device 41 and a resistor 57 between the grid 42 and ground. The resultant output across the resistor 57 may have positive peaks effective to cause conduction of the device 41 to discharge the capacitor 33. When such positive peaks are applied to the grid 42, it may become positive with respect to the cathode 43 so as to charge up the capacitor 56 with a polarity as indicated in the drawing so as to provide a negative grid bias for the device 41. Such bias will hold the device 41 in a non-conductive state until the occurrence of the next positive peak of signal. This bias is self-regulating.

It is believed that the operation of this circuit may be more clearly visualized by consideration of the wave forms at various points in the circuit, as illustrated in Fig. 2. Referring thereto, reference numeral 58 designates the wave form at the circuit point 51, reference numeral 59 designates the wave form at the circuit point 54, reference numeral 60 designates the wave form at the grid 42, and reference numeral 61 designates the wave form at the circuit point 34.

As illustrated by the wave form 58, only the negative half cycles of the sine wave signal from the secondary 49 will appear at the circuit point 51. This wave form is, of course, applied to the capacitor 53 and the resistor 55 in series and the voltage at the circuit point 54 may have a form such as illustrated by the wave form 59 in which positive peaks 62 appear at the ends of the negative half cycles, which is caused by the fact that the rate of change of voltage at the point 51 changes at this time, from a relatively high value to approximately zero. The positive peaks 62 could be utilized to directly control conduction of the device 41, but preferably the wave form 59 is applied to the capacitor 56 and resistor 57 in series with the grid 42 connected to the junction between the capacitor 56 and resistor 57. The wave form at the grid 42 may be as designated by reference numeral 60 in Figure 2 and may comprise very sharp positive peaks. Such positive peaks cause the capacitor 33 to be discharged very rapidly, and the wave form at the circuit point 34 may be as designated by reference numeral 61 in Figure 2. The trapezoidal form of the wave form 61 is caused by the provision of the rheostat 36 between the capacitor 33 and ground, this wave form being preferable for generating a saw tooth wave of current in the inductive deflection coil 16. The linearity may be adjusted by adjusting the rheostat 36.

As noted above, the capacitor 56 is charged up to provide bias for the device 41 and as shown in Figure 2, the voltage at the grid 42 swings positive only at the positive peaks. The cut-off bias for the device 41 may be at a level as designated by reference numeral 64 so that the device 41 is biased beyond cut-off except when the positive peaks are applied thereto. It may be noted that because of the self-regulating action of this bias arrangement, it is not only insured that the device 41 will be biased beyond cut-off between the positive pulses but the arrangement insures that the grid 42 will be driven positive with respect to the cathode 43 during the pulses so as to obtain a high conduction through the device 41 and a rapid discharge of the capacitor 33.

According to a specific feature of the invention, the secondary 49 not only develops a signal for controlling generation of the vertical sweep driving signal, but may also supply power for energization of the vertical sweep circuit and other circuits of the television camera. For this purpose, the terminal of the secondary winding 49 that is connected to the resistor 50 may be connected through a rectifier 65 and through a filtering choke 66 to the circuit point 32. The opposite ends of the filtering choke 66 may be connected to capacitors 67 and 68 to ground, the choke 66 cooperating with the capacitor 67 and 68 to provide a filtered D. C. voltage at the circuit point 32. This voltage may be applied to the control circuit 21, the video amplifier 22, the horizontal sweep generator 18 and the modulated oscillator 24, in addition to its connection to the vertical sweep generator 20.

According to a further specific feature of the invention, the cathode 43 of the device 41 may be connected to the cathode 11 of the pickup tube 10 to provide blanking during vertical retrace. The voltage at the cathode 43 will, of course be positive during discharge of the capacitor 33, at a time when the retrace of the cathode ray beam in the tube 10 is taking place. By applying this positive voltage to the cathode 11 of the tube 10, the tube will be cut-off during this time. The positive pulse output at the cathode 43 may also be connected to the video amplifier 22 to provide synchronization pulses to be transmitted to the receiver to control the vertical sweep at the receiver.

It will, accordingly, be readily appreciated that this invention provides a sweep driving circuit which is very simple and readily constructed from a minimum number of component parts, which is very efficient and reliable in operation, and which eliminates the necessity for frequency dividing circuits and synchronizing circuits heretofore employed.

It will be understood that modifications and variations may be effected without departing from the spirit and scope of the novel concepts of the present invention.

I claim as my invention:

1. In a cathode ray tube circuit including a cathode ray tube having a cathode, a target and a pair of deflection means for sweeping said target with a cathode ray beam from the cathode, a sweep generator, comprising: alternating current supply means; a rectifier connected to said alternating current supply means to develop a pulsating direct current; means for filtering said pulsating current to develop a substantially constant voltage; a capacitor; series resistance means for connecting said capacitor to said constant voltage; a discharge device having at least a cathode, an anode and a control grid; means for connecting said anode to said capacitor; a clipping rectifier connected to said alternating current supply means to transmit only the negative half cycle of the alternating current; at least one differentiating circuit connected to the output of said clipping rectifier to develop a sharp positive pulse during each cycle of the alternating current; means for applying said positive pulses to said control grid to cause said discharge device to periodically conduct and discharge said capacitor, and means for coupling said capacitor to one of said deflection means.

2. In a cathode ray tube circuit including a cathode ray tube having a cathode, a target and a pair of deflection means for sweeping said target with a cathode ray beam from the cathode, a sweep generator, comprising: alternating current supply means; a rectifier connected to said alternating current supply means to develop a pulsating direct current; means for filtering said pulsating current to develop a substantially constant voltage; a capacitor; series resistance means for connecting said capacitor to said constant voltage; a discharge device having at least a cathode, an anode and a control grid; means for connecting said anode to said capacitor; a clipping rectifier connected to said alternating current supply means to transmit only the negative half cycle of the alternating current; a first differentiating circuit connected to the output of said clipping rectifier to develop a sharp positive pulse during each cycle of the alternating current; a second differentiating circuit connected to the output of said first differentiating circuit to increase the sharpness of said positive pulses; means for applying the output of said second differentiating circuit to said control grid to cause said discharge device to periodically conduct and discharge said capacitor; and means for coupling said capacitor to one of said deflection means.

3. In a cathode ray tube circuit including a cathode ray tube having a cathode, a target and a pair of deflection means for sweeping said target with a cathode ray beam from the cathode, a sweep generator, comprising: alternating current supply means; a rectifier connected to said alternating current supply means to develop a pulsating direct current; means for filtering said pulsating current to develop a substantially constant voltage; a capacitor; series resistance means for connecting said capacitor to said constant voltage; a discharge device having at least a cathode, an anode and a control grid; means for connecting said anode to said capacitors; a clipping rectifier connected to said alternating current supply means to transmit only the negative half cycle of the alternating current; a differentiating circuit connected to the output of said clipping rectifier and including a first resistor and a first capacitor connected in series; a coupling including a second resistor and a second capacitor connected in series across said first resistor; means coupling to said control grid the signal developed across said second resistor to cause said discharge device to periodically conduct and discharge said capacitor, and means for coupling said capacitor to one of said deflection means.

4. In a cathode ray tube circuit including a cathode ray tube having a cathode, a target and a pair of deflection means for sweeping said target with a cathode ray beam from the cathode, a sweep generator, comprising: alternating current supply means; a rectifier connected to said alternating current supply means to develop a pulsating direct current; means for filtering said pulsating current to develop a substantially constant voltage; a capacitor; series resistance means for connecting said capacitor to said constant voltage; a discharge device having at least a cathode, an anode and a control grid; means for connecting said anode to said capacitor; a clipping rectifier connected to said alternating current supply means to transmit only the negative half cycle of the alternating current, at least one differentiating circuit connected to the output of said clipping rectifier to develop a sharp positive pulse during each cycle of the alternating current, means for applying said positive pulses to said control grid to cause said discharge device to periodically conduct and discharge said capacitor; and a connection between said cathode of said device and the cathode of the cathode ray tube for blanking said cathode ray tube during discharge of said capacitor.

References Cited in the file of this patent
UNITED STATES PATENTS

| | | |
|---|---|---|
| 2,222,943 | George | Nov. 26, 1940 |
| 2,224,587 | Bahring | Dec. 10, 1940 |
| 2,265,780 | Schlesinger | Dec. 9, 1941 |
| 2,383,333 | Milward | Aug. 21, 1945 |
| 2,424,999 | Ostlund et al. | Aug. 5, 1947 |
| 2,592,133 | Firestone et al. | Apr. 8, 1952 |
| 2,686,263 | Konick | Aug. 10, 1954 |